United States Patent
Hou et al.

(10) Patent No.: US 10,873,928 B2
(45) Date of Patent: Dec. 22, 2020

(54) TRANSMISSION METHOD, TRANSMISSION DEVICE, MOBILE COMMUNICATION TERMINAL AND NETWORK SIDE DEVICE

(71) Applicants: China Mobile Communication Ltd., Research Institute, Beijing (CN); China Mobile Communications Corporation, Beijing (CN)

(72) Inventors: Xueying Hou, Beijing (CN); Jing Dong, Beijing (CN); Lijie Hu, Beijing (CN); Rui Wang, Beijing (CN)

(73) Assignees: China Mobile Communication Ltd., Research Institute, Beijing (CN); China Mobile Communications Corporation, Beijing (CN)

( * ) Notice: Subject to any disclaimer, the term of this patent is extended or adjusted under 35 U.S.C. 154(b) by 55 days.

(21) Appl. No.: 16/316,985

(22) PCT Filed: Aug. 10, 2017

(86) PCT No.: PCT/CN2017/096796
§ 371 (c)(1),
(2) Date: Jan. 10, 2019

(87) PCT Pub. No.: WO2018/028632
PCT Pub. Date: Feb. 15, 2018

(65) Prior Publication Data
US 2019/0230651 A1   Jul. 25, 2019

(30) Foreign Application Priority Data

Aug. 11, 2016 (CN) .......................... 2016 1 0659305
Sep. 30, 2016 (CN) .......................... 2016 1 0874445

(51) Int. Cl.
*H04W 72/04* (2009.01)
*H04W 72/12* (2009.01)
(Continued)

(52) U.S. Cl.
CPC ...... *H04W 72/0413* (2013.01); *H04B 7/2656* (2013.01); *H04L 1/1812* (2013.01);
(Continued)

(58) Field of Classification Search
CPC ....... H04B 7/2656; H04L 1/1812; H04L 5/00; H04W 72/0413; H04W 72/0446; H04W 72/1268; H04W 72/14
See application file for complete search history.

(56) References Cited

U.S. PATENT DOCUMENTS

| 2015/0036561 A1 | 2/2015 | Wang et al. |
| 2016/0212761 A1 | 7/2016 | Li et al. |

(Continued)

FOREIGN PATENT DOCUMENTS

| CN | 101499894 A | 8/2009 |
| CN | 101801094 A | 8/2010 |

(Continued)

OTHER PUBLICATIONS

Chinese Office Action dated Jul. 31, 2019, for Chinese Patent Application No. 201610874445.1, 8 pages.
(Continued)

*Primary Examiner* — Andrew Lai
*Assistant Examiner* — M Mostazir Rahman
(74) *Attorney, Agent, or Firm* — Morgan, Lewis & Bockius LLP

(57) ABSTRACT

The present disclosure provides a transmission method, a transmission device, a mobile communication terminal, and a network side device, so as to implement bundling transmission of an uplink shared channel. The transmission method includes: a subframe determination step of determining, by a UE, a first start subframe within which a PUSCH is to be transmitted currently; and a first transmission step of, when a bundling transmission condition has
(Continued)

---

101 — determining, by a UE, a first start subframe within which a PUSCH is to be transmitted currently 102 — when a bundling transmission condition has been met, bundling a plurality of subframes from the first start subframe, and transmitting the PUSCH through uplink resources in the bundled subframes been met, bundling a plurality of subframes from the first start subframe, and transmitting the PUSCH through uplink resources in the bundled subframes, the bundled subframes at least comprising a special subframe having an UpPTS capable of being adopted for transmitting the PUSCH.

17 Claims, 7 Drawing Sheets

(51) Int. Cl.
  *H04B 7/26* (2006.01)
  *H04L 5/00* (2006.01)
  *H04L 1/18* (2006.01)
  *H04W 72/14* (2009.01)

(52) U.S. Cl.
  CPC .......... *H04L 5/00* (2013.01); *H04W 72/0446* (2013.01); *H04W 72/1268* (2013.01); *H04W 72/14* (2013.01)

(56) References Cited

U.S. PATENT DOCUMENTS

| | | | |
|---|---|---|---|
| 2017/0034819 A1* | 2/2017 | Wang | H04L 5/1469 |
| 2018/0270850 A1* | 9/2018 | Li | H04L 1/1822 |
| 2018/0351713 A1* | 12/2018 | Wang | H04L 5/0048 |

FOREIGN PATENT DOCUMENTS

| | | |
|---|---|---|
| CN | 104022856 A | 9/2014 |
| CN | 104272631 A | 1/2015 |
| CN | 105191201 A | 12/2015 |
| WO | WO 2013/165226 A1 | 11/2013 |
| WO | WO 2014/208924 A1 | 12/2014 |
| WO | WO 2015/042893 A1 | 4/2015 |
| WO | WO 2015/154310 A1 | 10/2015 |

OTHER PUBLICATIONS

English Translation of Chinese Office Action dated Jul. 31, 2019, for Chinese Patent Application No. 201610874445.1, 9 pages.
Written Opinion of the International Searching Authority dated Sep. 27, 2017, for PCT/CN2017/096796, 4 pages.
International Search Report with Written Opinion dated Sep. 27, 2017, for PCT/CN2017/096796, 11 pages.
Extended European Search Report dated Feb. 24, 2020, for PCT/CN2017096796, 12 pages.
R1-135261, 3GPP TSG RAN WG1 Meeting #75, San Francisco, USA, Nov. 11-15, 2013, "On the need to extend coverage enhancement for Configurations #2, #3, #4, #5," 6 pages.
R1-135281, 3GPP TSG RAN WG1 Meeting #75, San Francisco, USA, Nov. 11-15, 2013, "Email discussion on remaining issues of LTE coverage enhancements," 22 pages.
R1-168098, 3GPP TSG RAN WG1 Meeting #86, Gothenburg, Sweden, Aug. 22-26, 2-16, Agenda item 7.2.9, "WF on TTI bundling for PUSCH in UpPTS," 4 pages.

* cited by examiner

| 7 | 8 | 9 | 0 | 1 | 2 | 3 | 4 | 5 | 6 | 7 | 8 | 9 | 0 | 1 | 2 | 3 | 4 | 5 | 6 | 7 | 8 |
|---|---|---|---|---|---|---|---|---|---|---|---|---|---|---|---|---|---|---|---|---|---|
| D | D | D | D | S | U | U | U | D | D | D | D | D | D | S | U | U | U | D | D | D | D |
|   | ULG |   |   |   | U | U | U |   |   |   |   |   |   | S |   |   |   |   |   |   | a |

FIG. 3A

| 7 | 8 | 9 | 0 | 1 | 2 | 3 | 4 | 5 | 6 | 7 | 8 | 9 | 0 | 1 | 2 | 3 | 4 | 5 | 6 | 7 |
|---|---|---|---|---|---|---|---|---|---|---|---|---|---|---|---|---|---|---|---|---|
| D | D | D | D | S | U | U | U | D | D | D | D | D | D | S | U | U | U | D | D | D |
|   | ULG |   |   |   | U | U | U |   |   |   |   |   |   | S |   |   |   | a | a |   |

FIG. 3B

| 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|
| D | D | D | S | U | U | U | D | D | D | D | D | S | U | U | U | D | D | D | D | D | D |
|   | ULG |   |   |   | U | U |   |   |   |   |   | S | U |   |   |   |   |   | a |   |   |

FIG. 3C

| 9 | 0 | 1 | 2 | 3 | 4 | 5 | 6 | 7 | 8 | 9 | 0 | 1 | 2 | 3 | 4 | 5 | 6 | 7 | 8 | 9 | 0 |
|---|---|---|---|---|---|---|---|---|---|---|---|---|---|---|---|---|---|---|---|---|---|
| D | D | S | U | U | U | D | D | D | D | D | S | U | U | U | D | D | D | D | D | D | D |
|   | ULG |   |   |   | U |   |   |   |   |   | S | U | U |   |   |   |   |   | a |   |   |

FIG. 3D

| 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|
| D | D | D | D | D | S | U | U | U | D | D | D | D | D | D | S |
|   | ULG |   |   |   | S | U | U | U |   |   |   |   |   | a |   |

FIG. 3E

| 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|
| D | S | U | D | D | D | S | U | D | D | D | S | U | D | D | D | S | U | D | D |
| ULG | ULG |   |   |   |   | U | U |   |   |   | U | U |   |   |   |   |   | a |   |

FIG. 4A

| 2 | 3 | 4 | 5 | 6 | 7 | 8 | 9 | 0 | 1 | 2 | 3 | 4 | 5 | 6 | 7 | 8 | 9 | 0 | 1 | 2 | 3 | 4 |
|---|---|---|---|---|---|---|---|---|---|---|---|---|---|---|---|---|---|---|---|---|---|---|
| U | D | D | D | S | U | D | D | D | S | U | D | D | D | S | U | D | D | D | S | U | D | D |
|   | ULG |   |   |   | U |   |   |   | U | U |   |   |   | U |   |   |   |   |   |   | a |   |

FIG. 4B

| 2 | 3 | 4 | 5 | 6 | 7 | 8 | 9 | 0 | 1 | 2 | 3 | 4 | 5 | 6 | 7 | 8 | 9 | 0 | 1 |
|---|---|---|---|---|---|---|---|---|---|---|---|---|---|---|---|---|---|---|---|
| U | D | D | D | S | U | D | D | D | S | U | D | D | D | S | U | D | D | D | S |
|   | ULG |   |   |   | U |   |   |   | U | U |   |   |   | U |   |   |   | a |   |

FIG. 4C

| 5 | 6 | 7 | 8 | 9 | 0 | 1 | 2 | 3 | 4 | 5 | 6 | 7 | 8 | 9 | 0 | 1 | 2 | 3 | 4 |
|---|---|---|---|---|---|---|---|---|---|---|---|---|---|---|---|---|---|---|---|
| D | S | U | D | D | D | S | U | D | D | D | S | U | D | D | D | S | U | D | D |
| ULG | ULG |   |   |   |   | U | U |   |   |   | U | U |   |   |   |   |   | a |   |

FIG. 4D

| 7 | 8 | 9 | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|---|---|
| U | D | D | D | S | U | D | D | D | S | U | D | D | D | S | U | D | D | D | S | U | D | D |
|   | ULG |   |   |   | U |   |   |   | U | U |   |   |   | U |   |   |   |   |   |   | a |   |

FIG. 4E

| 7 | 8 | 9 | 0 | 1 | 2 | 3 | 4 | 5 | 6 | 7 | 8 | 9 | 0 | 1 | 2 | 3 | 4 | 5 | 6 |
|---|---|---|---|---|---|---|---|---|---|---|---|---|---|---|---|---|---|---|---|
| U | D | D | D | S | U | D | D | D | S | U | D | D | D | S | U | D | D | D | S |
|   | ULG |   |   |   | U |   |   |   | U | U |   |   |   | U |   |   |   | a |   |

FIG. 4F receiving, by a network side device, a PUSCH transmitted from a UE through uplink resources in bundled subframes which have been bundled from the first start subframe when a bundling transmission condition has been met /501

FIG. 5 receiving, by a network side device, a PUSCH transmitted from a UE through uplink resources in bundled subframes which have been bundled from the first start subframe when a bundling transmission condition has been met /501 transmitting, within a second start subframe, a PHICH corresponding to the PUSCH received in step 501 /502

FIG. 6

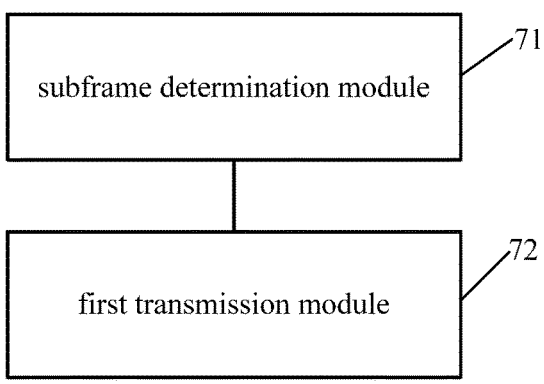

FIG. 7

TRANSMISSION METHOD, TRANSMISSION DEVICE, MOBILE COMMUNICATION TERMINAL AND NETWORK SIDE DEVICE

CROSS-REFERENCE TO RELATED APPLICATION

The present application is the U.S. national phase of PCT Application No. PCT/CN2017/096796 filed on Aug. 10, 2017, which claims a priority of the Chinese patent application No. 201610659305.2 filed on Aug. 11, 2016 and a priority of the Chinese patent application No. 201610874445.1 filed on Sep. 30, 2016, which are incorporated herein by reference in its entirety.

TECHNICAL FIELD

The present disclosure relates to the field of mobile communication technology, in particular to a transmission method, a transmission device, a mobile communication terminal and a network side device, so as to achieve bundling transmission of an uplink shared channel.

BACKGROUND

Subframe structures having an equal length are adopted by a Time Division Long Term Evolution (TD-LTE) system. Each subframe has a length of 1 ms and includes two time slots each having a length of 0.5 ms. A radio frame includes 10 subframes, i.e., the radio frame has a length of 10 ms. A basic transmission Time Interval (TTI) for the TD-LTE system has a length equal to one subframe, i.e., 1 ms. Correspondingly, an interval between a TTI for feedback and a TTI for data transmission needs to be set in accordance with such factors as a data transmission time delay and a data processing time period of a device, and usually, this interval has a length of 4 TTIs. In addition, a special subframe has been introduced into the TD-LTE system. The special subframe consists of a Downlink Pilot Time Slot (DwPTS), a Guard Period (GP), and an Uplink Pilot Time Slot (UpPTS).

For the LTE system, a basic unit scheduled at a physical layer is 1 ms, and due to such a small time interval, it is able to provide a relatively small time delay in the LTE system. However, the coverage is limited at edges of some cells. Due to limited transmission power of a User Equipment (UE), it is probably impossible for the UE to meet a requirement on Block Error Rate (BLER) for the data transmission within the time interval of 1 ms. Hence, such a concept as TTI bundling has been proposed for the LTE system. To be specific, consecutive TTIs for uplink transmission are bundled together and allocated for a same UE. In this way, it is able to increase a probability of successful data decoding, thereby to increase uplink coverage. Upon the receipt of all the bundled uplink subframes, a network side device may return Acknowledgement (ACK)/Non-Acknowledgement (NACK).

However, the transmission of a Physical Uplink Shared Channel (PUSCH) within the special subframe is not supported by a conventional protocol, and during the transmission of the PUSCH, the TTI bundling transmission is not supported in some Time Division Duplexing (TDD) subframe configurations (e.g., configurations #2 and #3). Hence, the uplink coverage for some subframe configurations is relatively insufficient.

SUMMARY

An object of the present disclosure is to provide a transmission method, a transmission device, a mobile communication terminal, and a network side device, so as to achieve the bundling transmission of an uplink shared channel.

In one aspect, the present disclosure provides in some embodiments a transmission method, including: a subframe determination step of determining, by a UE, a first start subframe within which a PUSCH is to be transmitted currently; and a first transmission step of, when a bundling transmission condition has been met, bundling a plurality of subframes from the first start subframe, and transmitting the PUSCH through uplink resources in the bundled subframes, the bundled subframes at least including a special subframe having an UpPTS capable of being adopted for transmitting the PUSCH.

In another aspect, the present disclosure provides in some embodiments a transmission method, including a second reception step of receiving, by a network side device, a PUSCH transmitted from a UE through uplink resources in bundled subframes which have been bundled from the first start subframe when a bundling transmission condition has been met, the bundled subframes at least including a special subframe having an UpPTS capable of being adopted for transmitting the PUSCH.

In yet another aspect, the present disclosure provides in some embodiments a transmission device at a network side, including: a subframe determination module configured to determine a first start subframe within which a PUSCH is to be transmitted currently; and a first transmission module configured to, when a bundling transmission condition has been met, bind a plurality of subframes from the first start subframe, and transmit the PUSCH through uplink resources in the bundled subframes, the bundled subframes at least including a special subframe having an UpPTS capable of being adopted for transmitting the PUSCH.

In still yet another aspect, the present disclosure provides in some embodiment a transmission device at a network side, including a second reception module configured to receive a PUSCH transmitted from a UE through uplink resources in bundled subframes which have been bundled from the first start subframe when a bundling transmission condition has been met, the bundled subframes at least including a special subframe having an UpPTS capable of being adopted for transmitting the PUSCH.

In still yet another aspect, the present disclosure provides in some embodiments a transmission device at a UE side, including a processor, and a memory configured to store therein a computer-readable instruction capable of being executed by the processor. The processor is configured to execute the computer-readable instruction, so as to: determine a first start subframe within which a PUSCH is to be transmitted currently; and when a bundling transmission condition has been met, bind a plurality of subframes from the first start subframe, and transmit the PUSCH through uplink resources in the bundled subframes. The bundled subframes at least include a special subframe having an UpPTS capable of being adopted for transmitting the PUSCH.

In still yet another aspect, the present disclosure provides in some embodiments a non-transitory computer-readable storage medium storing therein a computer-readable instruction capable of being executed by a processor. The processor is configured to execute the computer-readable instruction, so as to: determine a first start subframe within which a PUSCH is to be transmitted currently; and when a bundling transmission condition has been met, bind a plurality of subframes from the first start subframe, and transmit the PUSCH through uplink resources in the bundled subframes. The bundled subframes at least include a special subframe having an UpPTS capable of being adopted for transmitting the PUSCH.

In still yet another aspect, the present disclosure provides in some embodiments a transmission device at a network side, including a processor, and a memory configured to store therein a computer-readable instruction capable of being executed by the processor. The processor is configured to execute the computer-readable instruction, so as to receive a PUSCH transmitted from a UE through uplink resources in bundled subframes which have been bundled from the first start subframe when a bundling transmission condition has been met. The bundled subframes at least include a special subframe having an UpPTS capable of being adopted for transmitting the PUSCH.

In still yet another aspect, the present disclosure provides in some embodiments a non-transitory computer-readable storage medium storing therein a computer-readable instruction capable of being executed by a processor. The processor is configured to execute the computer-readable instruction, so as to receive a PUSCH transmitted from a UE through uplink resources in bundled subframes which have been bundled from the first start subframe when a bundling transmission condition has been met. The bundled subframes at least include a special subframe having an UpPTS capable of being adopted for transmitting the PUSCH.

In still yet another aspect, the present disclosure provides in some embodiments a mobile communication terminal including the above-mentioned transmission device at a UE side.

In still yet another aspect, the present disclosure provides in some embodiments a network side device including the above-mentioned transmission device at a network side.

According to the embodiments of the present disclosure, the PUSCH is transmitted within the UpPTS, and when the TTI bundling transmission condition has been met, the transmission of the PUSCH is achieved through a TTI bundling technology. As a result, it is able to improve the uplink coverage.

BRIEF DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 3A-3E are sequence diagrams of the transmission method for an uplink-downlink configuration #3 according to some embodiments of the present disclosure;

FIG. 4A-4F are sequence diagrams of the transmission method for an uplink-downlink configuration #2 according to some embodiments of the present disclosure;

FIG. 5 is a flow chart of a transmission method at a network side according to some embodiments of the present disclosure;

FIG. 6 is another flow chart of the transmission method at a network side according to some embodiments of the present disclosure;

FIG. 7 is a schematic view showing a transmission device at a UE side according to some embodiments of the present disclosure;

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, an UpPTS is scheduled so as to transmit a PUSCH, and the transmission of the PUSCH is achieved through a TTI bundling technology. As a result, it is able to improve the uplink coverage.

Figure 1:
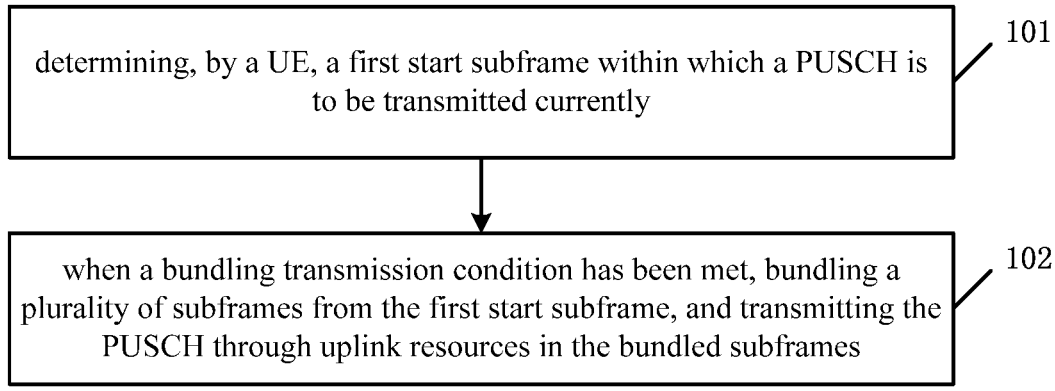
FIG. 1 is a flow chart of a transmission method at a UE side according to some embodiments of the present disclosure.

The present disclosure provides in some embodiments a transmission method which, as shown in FIG. 1, includes: a subframe determination step 101 of determining, by a UE, a first start subframe within which a PUSCH is to be transmitted currently; and a first transmission step 102 of, when a bundling transmission condition has been met, bundling a plurality of subframes from the first start subframe, and transmitting the PUSCH through uplink resources in the bundled subframes. The bundled subframes at least include a special subframe having an Uplink Pilot Time Slot (UpPTS) capable of being adopted for transmitting the PUSCH.

According to the embodiments of the present disclosure, the PUSCH is transmitted within the UpPTS, and when the TTI bundling transmission condition has been met, the transmission of the PUSCH is achieved through a TTI bundling technology. As a result, it is able to improve the uplink coverage.

In the embodiments of the present disclosure, the uplink resources within the UpPTS and an uplink subframe may be bundled together for the transmission of the PUSCH. The quantity of the uplink resources within the UpPTS may be different from the quantity of the uplink resources within the uplink subframe. For example, for a special subframe within which DwPTS:GP:UpPTS is 6:2:6, usually the quantity of the resources within the UpPTS is 43% (6/14) of the quantity of the uplink resources within the uplink subframe. At this time, when a size of a transmission block is determined on the basis of the resources within the UpPTS, the transmission efficiency of the normal uplink subframe may be reduced due to the relatively large quantity of available resources within the uplink subframe. When the size of the transmission block is determined on the basis of the uplink resources within the uplink subframe, an encoding rate of the PUSCH transmitted within the UpPTS may be greater than 1 and the transmission performance may be adversely affected due to the relatively small quantity of available resources within the UpPTS.

Considering the above factors, in a possible embodiment of the present disclosure, an appropriate transmission block may be determined for each of the uplink subframe and the UpPTS, so as to improve the transmission performance and the transmission efficiency.

In the first transmission step, the quantity N' of physical blocks to be allocated for the UpPTS may be determined in accordance with the quantity N of physical blocks allocated by a network side device for the uplink subframe through the formula N'=[α*N], where [ ] represents a rounding operation, and α represents a scaling coefficient.

In a possible embodiment of the present disclosure, N' may be determined in accordance with the quantity $K_{Normal}$ of symbols available for the transmission of the PUSCH within the uplink subframe and the quantity $K_{UpPTS}$ of symbols available for the transmission of the PUSCH within the UpPTS, and α=$K_{Normal}/K_{UpPTS}$.

When the quantity $K_{Normal}$ of the symbols available for the transmission of the PUSCH within the uplink subframe is 1, α=12; when $K_{Normal}$ is 2, α=6; when $K_{Normal}$ is 3, α=4; when $K_{Normal}$ is 5, α=2.4; and when $K_{Normal}$ is 6, α=2, and so on.

As mentioned above, the quantity of the physical blocks within the UpPTS may be scaled up in accordance with the ratio of $K_{Normal}$ to $K_{UpPTS}$.

When the quantity of the physical blocks within the uplink subframe is different from the quantity of the physical blocks within the UpPTS, transmission power may be configured for each of the uplink subframe and the UpPTS. The transmission power for the transmission of the PUSCH within the UpPTS of the first start subframe may be determined in accordance with N'. As specified in the $3^{rd}$-Generation Partnership Projection (3GPP) Technical Specification (TS) 36.213, $P_{PUSCH}(i)$=min $\{P_{CMAX}, 10 \log_{10}(M_{PUSCH}(i))+P_{O\_PUSCH}(j)+\alpha(j)\cdot PL+\Delta_{TF}(i)+f(i)\}$, where $M_{PUSCH}(i)$ represents the quantity N' of the physical blocks allocated for the UpPTS.

During the allocation of the resources, it is necessary to determine the quantity of the physical blocks as well as a start position of each of the UpPTS and the uplink subframe at a frequency domain. In a possible embodiment of the present disclosure, at the frequency domain, a start position of the UpPTS of the special subframe for the transmission of the PUSCH may be the same as a start position of the uplink subframe for the transmission of the PUSCH.

In a possible embodiment of the present disclosure, in the subframe determination step, a position of the first start subframe may be determined in accordance with a position of a reference subframe in a current frame structure and an uplink-downlink configuration of the current frame structure.

The reference subframe may be a subframe where an uplink grant is located or a subframe within which a PHICH has been received.

Table 1 shows conventional TDD subframe configurations.

TABLE 1

| Uplink-downlink configuration | Uplink-downlink switch-point periodicity | Subframe number & type | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, for TDD subframe configurations #0, #1 and #6, the quantities of the uplink subframes are 6, 4 and 5 respectively, so it is able to achieve the TTI bundling. For TDD subframe configurations #4 and #5, sums of the uplink subframes and the special subframes are 2 and 3 respectively, and at this time, even when the PUSCH is capable of being transmitted within the UpPTS of each special subframe, it is still impossible to achieve the TTI bundling due to the quantities thereof.

Hence, the scheme in the embodiments of the present disclosure may be at first designed for the uplink-downlink configurations #2 and #3 so as to achieve the TTI bundling transmission of the PUSCH. Corresponding criterions will be described as follows.

At first, a time interval between the uplink grant and a first one of the scheduled, bundled TTIs shall be as short as possible. Taking the uplink-downlink configuration #3 as an example, when the uplink grant is located at a subframe 6, the first one of the scheduled, bundled TTIs shall be a first special subframe, rather than a subsequent TTI.

Next, considering the compatibility with a conventional UE, when a last TTI of the bundled TTIs is the UpPTS, the PHICH corresponding to the PUSCH shall merely be transmitted on an original PHICH resource.

Next, a sequence of the normal subframes shall be affected by a newly-designed sequence as small as possible.

Finally, an interval between the uplink grant transmission and the data transmission shall be not smaller than 4 ms, and an interval between the data transmission and ACK/NACK feedback shall be not smaller than 4 ms either.

It should be appreciated that, it is not required to follow the above criterions, and instead, these criterions are merely adopted so as to reduce the design difficulty and the system complexity.

<Uplink-Downlink Configuration #2>

For the uplink-downlink configuration #2, two special time slots are included and located in a subframe 2 and a subframe 6 respectively. In order to transmit the PUSCH within the subframe 2 and the subframe 6, the following schemes will be provided.

Scheme 1

When the reference subframe is a subframe where the uplink grant is located and the uplink grant is to be transmitted within a subframe N1 for the uplink-downlink configuration #2, the PUSCH may be transmitted from a subframe N1+K1, and there are the following two schemes.

When N1 is 0 or 5, K1 is 6, and when N1 is 3 or 8, K1 is 4, and when N1 is 0, K1 is 6, as shown in Table 2.

TABLE 2

| TDD uplink-downlink configuration | N1 | | | | | | | | | |
|---|---|---|---|---|---|---|---|---|---|---|
| | 0 | 1 | 2 | 3 | 4 | 5 | 6 | 7 | 8 | 9 |
| 2 | K1 = 6 | | | K1 = 4 | | K1 = 6 | | | K1 = 4 | |

Considering the above four criterions, when a subframe design scheme for the transmission of the PUSCH in Table 2 (i.e., the subframe N1+K1 within which the PUSCH is transmitted) corresponds to the subframe within which the PHICH has been received and the reference subframe is the subframe within which the PHICH has been received, a subframe within which the PHICH was received previously is N3−L1 (N3 is equal to N1), and the position of the first start subframe is N3+K3 (K3 is equal to K1). When N3 is 0 or 5, L1 is 2 and K3 is 6, and when N3 is 3 or 8, L1 is 0 and K3 is 4. Table 3 shows the design of L1.

TABLE 3

| TDD uplink-downlink configuration | N3 | | | | | | | | | |
|---|---|---|---|---|---|---|---|---|---|---|
| | 0 | 1 | 2 | 3 | 4 | 5 | 6 | 7 | 8 | 9 |
| 2 | L1 = 2 | | | L1 = 0 | | L1 = 2 | | | L1 = 0 | |

Alternatively, L1 may also be designed in any other way. For example, a time interval between the PHICH and a last TTI of the bundled TTIs corresponding to ACK may be provided as short as possible.

In the case that a design criterion is changed, a corresponding design scheme of L1 may be described as follows. When the subframe design scheme for the transmission of the PUSCH in Table 2 (i.e., the subframe N1+K1 within which the PUSCH is transmitted) corresponds to the subframe within which the PHICH has been received and the reference subframe is the subframe within which the PHICH has been received, a subframe within which the PHICH was received previously is N3−L1 (N3 is equal to N1), and the position of the first start subframe is N3+K3 (K3 is equal to K1). When N3 is 0 or 5, L1 is 2 and K3 is 6, and when N3 is 3 or 8, L1 is 3 and K3 is 4. Table 4 shows the design of L1.

TABLE 4

| TDD uplink-downlink configuration | N3 | | | | | | | | | |
|---|---|---|---|---|---|---|---|---|---|---|
| | 0 | 1 | 2 | 3 | 4 | 5 | 6 | 7 | 8 | 9 |
| 2 | L1 = 2 | | | L1 = 3 | | L1 = 2 | | | L1 = 3 | |

Scheme 2

When the reference subframe is the subframe where the uplink grant is located, for the uplink-downlink configuration #2, the position of the reference subframe in the current frame structure is N2, and the position of the first start subframe is N2+K2. When N2 is 1 or 6, K2 is 5, and when N2 is 3 or 8, K2 is 4, as shown in Table 5.

TABLE 5

| TDD uplink-downlink configuration | N2 | | | | | | | | | |
|---|---|---|---|---|---|---|---|---|---|---|
| | 0 | 1 | 2 | 3 | 4 | 5 | 6 | 7 | 8 | 9 |
| 2 | | K2 = 5 | | K2 = 4 | | | K2 = 5 | | K2 = 4 | |

Considering the above four criterions, when a subframe design scheme for the transmission of the PUSCH in Table 5 (i.e., the subframe N1+K1 within which the PUSCH is transmitted) corresponds to the subframe within which the PHICH has been received and the reference subframe is the subframe within which the PHICH has been received, the position of the reference subframe in the current frame structure is N4−L2 (N4 is equal to N2), and the position of the first start subframe is N4+K4 (K4 is equal to K2). Table 6 shows the design of L2.

TABLE 6

| TDD uplink-downlink configuration | N2 | | | | | | | | | |
|---|---|---|---|---|---|---|---|---|---|---|
| | 0 | 1 | 2 | 3 | 4 | 5 | 6 | 7 | 8 | 9 |
| 2 | | L2 = 3 | | L2 = 0 | | | L2 = 3 | | L2 = 0 | |

Alternatively, L2 may also be designed in any other way. For example, the time interval between the PHICH and the last TTI of the bundled TTIs corresponding to the ACK may be provided as short as possible.

In the case that a design criterion is changed, a corresponding design scheme of L2 may be described as follows. When the subframe design scheme for the transmission of the PUSCH in Table 5 (i.e., the subframe N1+K1 within which the PUSCH is transmitted) corresponds to the subframe within which the PHICH has been received and the reference subframe is the subframe within which the PHICH has been received, the position of the reference subframe in the current frame structure is N4−L2 (N4 is equal to N2), and the position of the first start subframe is N4+K4 (K4 is equal to K2). Table 7 shows the design of L2.

TABLE 7

| TDD uplink-downlink configuration | N2 | | | | | | | | | |
|---|---|---|---|---|---|---|---|---|---|---|
| | 0 | 1 | 2 | 3 | 4 | 5 | 6 | 7 | 8 | 9 |
| 2 | | L2 = 3 | | L2 = 3 | | | L2 = 3 | | L2 = 3 | |

In Tables 2-7, for an end subframe for the transmission of the PUSCH, there are the following four circumstances. When the uplink grant is transmitted within a subframe 0 or 1, a start subframe for the transmission of the PUSCH is the subframe 6, and four subframes each having the uplink resources are adopted, so the transmission of the PUSCH may be ended within a subframe 2. When the uplink grant is transmitted within a subframe 3, a start subframe for the transmission of the PUSCH is a subframe 7, and four subframes each having the uplink resources are adopted, so the transmission of the PUSCH may be ended within the subframe 6. When the uplink grant is transmitted within a subframe 5 or 6, a start subframe for the transmission of the PUSCH is the subframe 1, and four subframes each having the uplink resources are adopted, so the transmission of the PUSCH may be ended within the subframe 7. When the uplink grant is transmitted within a subframe 8, a start subframe for the transmission of the PUSCH is the subframe 2, and four subframes each having the uplink resources are adopted, so the transmission of the PUSCH may be ended within the subframe 1.

Figure 2:
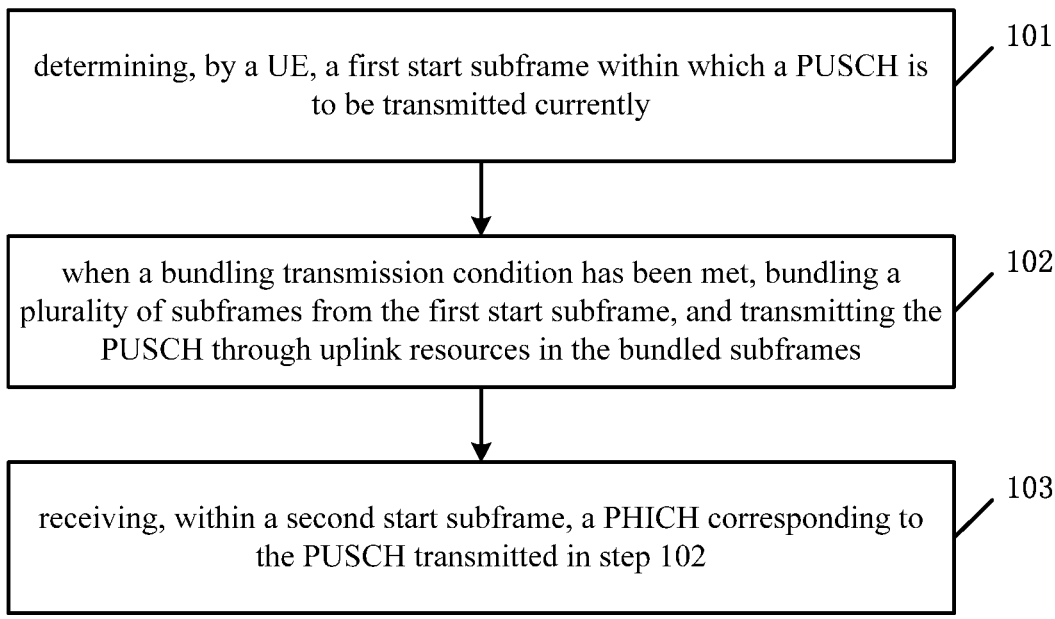
FIG. 2 is another flow chart of the transmission method at a UE side according to some embodiments of the present disclosure.

In a possible embodiment of the present disclosure, as shown in FIG. 2, the transmission method further includes a first reception step 103 of receiving, within a second start subframe, the PHICH corresponding to the PUSCH transmitted in the first transmission step.

A position of the second start subframe is determined in accordance with a position of a last subframe for the transmission of the PUSCH in the current frame structure and the uplink-downlink configuration of the current frame structure.

For the uplink-downlink configuration #2, in the above design scheme, there are the above four circumstances for the last subframe for the transmission of the PUSCH, i.e., the last subframe is the subframe 1, the subframe 2, the subframe 6 or the subframe 7. When the position of the last subframe in the current frame structure is N8 (N8 is equal to N1+K1 or N2+K2), the position of the second start subframe is N8+K8. When N8 is 1 or 6, K8 is 7, and when N8 is 2 or 7, K8 is 6, as shown in Table 8.

TABLE 8

| TDD uplink-downlink configuration | N8 | | | | | | | | | |
|---|---|---|---|---|---|---|---|---|---|---|
| | 0 | 1 | 2 | 3 | 4 | 5 | 6 | 7 | 8 | 9 |
| 2 | | K8 = 7 | K8 = 6 | | | | K8 = 7 | K8 = 6 | | |

Alternatively, K8 may be designed in any other way. For example, the time interval between the PHICH and the last TTI of the bundled TTIs corresponding to the ACK may be provided as short as possible.

In the case that a design criterion is changed, a corresponding design scheme of K8 may be described as follows. When the position of the last subframe in the current frame structure is N8 (N8 is equal to N1+K1 or N2+K2), the position of the second start subframe is N8+K8. When N8 is 1 or 6, K8 is 4, and when N8 is 2 or 7, K8 is 6, as shown in Table 9.

TABLE 9

| TDD uplink-downlink configuration | N8 | | | | | | | | | |
|---|---|---|---|---|---|---|---|---|---|---|
| | 0 | 1 | 2 | 3 | 4 | 5 | 6 | 7 | 8 | 9 |
| 2 | | K8 = 4 | K8 = 6 | | | | K8 = 4 | K8 = 6 | | |

<Uplink-Downlink Configuration #3>

For the uplink-downlink configuration #3, one special time slot is included and located in the subframe 2. In order to transmit the PUSCH within the subframe 2, the following schemes will be provided.

Scheme 1

When the reference subframe is the subframe where the uplink grant is located and the uplink grant is to be transmitted within a subframe N5 for the uplink-downlink configuration #3, the PUSCH may be transmitted from a subframe N5+K5. When N5 is 0, 7, 8 or 9, K5 is 4, as shown in Table 10.

TABLE 10

| TDD uplink-downlink configuration | N5 | | | | | | | | | |
|---|---|---|---|---|---|---|---|---|---|---|
| | 0 | 1 | 2 | 3 | 4 | 5 | 6 | 7 | 8 | 9 |
| 3 | K5 = 4 | | | | | | | K5 = 4 | K5 = 4 | K5 = 4 |

When a subframe design scheme for the transmission of the PUSCH in Table 10 (i.e., the subframe N5+K6 within which the PUSCH is transmitted) corresponds to the subframe within which the PHICH has been received and the reference subframe is the subframe within which the PHICH has been received, a subframe within which the PHICH was received previously is N6−L3 (N6 is equal to N5). Table 11 shows the design of L3.

TABLE 11

| TDD uplink-downlink configuration | N6 | | | | | | | | | |
|---|---|---|---|---|---|---|---|---|---|---|
| | 0 | 1 | 2 | 3 | 4 | 5 | 6 | 7 | 8 | 9 |
| 3 | L3 = 1 | | | | | | | L3 = 7 | L3 = 0 | L3 = 1 |

Alternatively, L3 may also be designed in any other way. For example, the time interval between the PHICH and the last TTI of the bundled TTIs corresponding to the ACK may be provided as short as possible.

In the case that a design criterion is changed, a corresponding design scheme of L4 may be described as follows. When the subframe design scheme for the transmission of the PUSCH in Table 10 (i.e., the subframe N5+K6 within which the PUSCH is transmitted) corresponds to the subframe within which the PHICH has been received and the reference subframe is the subframe within which the PHICH has been received, a subframe within which the PHICH was received previously is N7−L4 (N7 is equal to N5). Table 12 shows the design of L4.

TABLE 12

| TDD uplink-downlink configuration | N6 | | | | | | | | | |
|---|---|---|---|---|---|---|---|---|---|---|
| | 0 | 1 | 2 | 3 | 4 | 5 | 6 | 7 | 8 | 9 |
| 3 | | L4 = 1 | | | | | | L4 = 7 | L4 = 3 or 1 | L4 = 1 |

In Tables 10-12, for the end subframe for the transmission of the PUSCH, there are the following four circumstances. When the uplink grant is transmitted within the subframe 0, a start subframe for the transmission of the PUSCH is the subframe 4, and four subframes each having the uplink resources are adopted, so the transmission of the PUSCH may be ended within the subframe 3. When the uplink grant is transmitted within the subframe 7, a start subframe for the transmission of the PUSCH is the subframe 1, and four subframes each having the uplink resources are adopted, so the transmission of the PUSCH may be ended within the subframe 4. When the uplink grant is transmitted within the subframe 8, a start subframe for the transmission of the PUSCH is the subframe 2, and four subframes each having the uplink resources are adopted, so the transmission of the PUSCH may be ended within the subframe 1. When the uplink grant is transmitted within the subframe 9, a start subframe for the transmission of the PUSCH is the start subframe 3, and four subframes each having the uplink resources are adopted, so the transmission of the PUSCH may be ended within the subframe 2.

For the uplink-downlink configuration #3, the transmission method further includes a first reception step of receiving, within a second start subframe, the PHICH corresponding to the PUSCH transmitted in the first transmission step.

A position of the second start subframe is determined in accordance with a position of a last subframe for the transmission of the PUSCH in the current frame structure and the uplink-downlink configuration of the current frame structure.

For the uplink-downlink configuration #3, in the above design scheme, there are the above four circumstances for the last subframe for the transmission of the PUSCH, i.e., the last subframe is the subframe 1, the subframe 2, the subframe 3 or the subframe 4. When the position of the last subframe in the current frame structure is N9 (N9 is equal to N5+K5), the position of the second start subframe is N9+K9. When N9 is 1, K9 is 7, and when N9 is 2, 3 or 4, K9 is 6, as shown in Table 13.

TABLE 13

| TDD uplink-downlink configuration | N9 | | | | | | | | | |
|---|---|---|---|---|---|---|---|---|---|---|
| | 0 | 1 | 2 | 3 | 4 | 5 | 6 | 7 | 8 | 9 |
| 3 | | K9 = 7 | K9 = 6 | K9 = 6 | K9 = 6 | | | | | |

Alternatively, K9 may be designed in any other way. For example, the time interval between the PHICH and the last TTI of the bundled TTIs corresponding to the ACK may be provided as short as possible.

In the case that a design criterion is changed, a corresponding design scheme of K10 may be described as follows. For the uplink-downlink configuration #3, there are the above four circumstances for the last subframe for the transmission of the PUSCH, i.e., the last subframe is the subframe 1, the subframe 2, the subframe 3 or the subframe 4. When the position of the last subframe in the current frame structure is N10 (N10 is equal to N5+K5), the position of the second start subframe is N10+K10. When N10 is 1, K10 is 6 or 4, and when N10 is 2, 3 or 4, K10 is 6, as shown in Table 14.

TABLE 14

| TDD uplink-downlink configuration | N9 | | | | | | | | | |
|---|---|---|---|---|---|---|---|---|---|---|
| | 0 | 1 | 2 | 3 | 4 | 5 | 6 | 7 | 8 | 9 |
| 3 | | K10 = 6 or 4 | K10 = 6 | K10 = 6 | K10 = 6 | | | | | |

In a possible embodiment of the present disclosure, when the PUSCH is transmitted in accordance with the above-mentioned sequence through the TTI bundling, the quantity of Hybrid Automatic Repeat reQuest (HARQ) processes may be 2.

The actual transmission corresponding to parts of the sequence diagrams will be described hereinafter.

As shown in FIG. 3A, which shows the transmission of the uplink grant within the subframe 8 for the uplink-downlink configuration #3, when the uplink grant is transmitted within the subframe 8, K5=4, i.e., the transmission of the PUSCH may be started from the subframe 2, continued within four subframes each having the uplink resources, and ended within the subframe 1. At this time, a subframe offset value corresponding to the PHICH is 7, i.e., the PHICH is received within the subframe 8.

As shown in FIG. 3B, which shows the transmission of the uplink grant within the subframe 8 for the uplink-downlink configuration #3, when the uplink grant is transmitted within the subframe 8, K5=4, i.e., the transmission of the PUSCH may be started from the subframe 2, continued within four subframes each having the uplink resources, and ended within the subframe 1. At this time, a subframe offset value corresponding to the PHICH is 4 or 6, i.e., the PHICH is received within the subframe 5 or 7.

As shown in FIG. 3C, which shows the transmission of the uplink grant within the subframe 9 for the uplink-downlink configuration #3, when the uplink grant is transmitted within the subframe 9, K5=4, i.e., the transmission of the PUSCH may be started from the subframe 3, continued within four subframes each having the uplink resources, and ended within the subframe 2. At this time, a subframe offset value corresponding to the PHICH is 6, i.e., the PHICH may be received within the subframe 8.

As shown in FIG. 3D, which shows the transmission of the uplink grant within the subframe 0 for the uplink-downlink configuration #3, when the uplink grant is transmitted within the subframe 0, K5=4, i.e., the transmission of the PUSCH may be started from the subframe 4, continued within four subframes each having the uplink resources, and ended within the subframe 3. At this time, a subframe offset value corresponding to the PHICH is 6, i.e., the PHICH may be received within the subframe 9.

As shown in FIG. 3E, which shows the transmission of the uplink grant within the subframe 7 for the uplink-downlink configuration #3, when the uplink grant is transmitted within the subframe 7, K5=4, i.e., the transmission of the PUSCH may be started from the subframe 1, continued within four subframes each having the uplink resources, and ended within the subframe 4. At this time, a subframe offset value corresponding to the PHICH is 6, i.e., the PHICH may be received within the subframe 0.

As shown in FIG. 4A, which shows the transmission of the uplink grant within the subframe 0 or 1 for the uplink-downlink configuration #2, when the uplink grant is transmitted within the subframe 0 or 1, K1=6 and K2=5, i.e., the transmission of the PUSCH may be started from the subframe 6 (the special subframe), continued within four subframes each having the uplink resources, and ended within the subframe 2. At this time, a subframe offset value corresponding to the PHICH is 6, i.e., the PHICH may be received within the subframe 8.

As shown in FIG. 4B, which shows the transmission of the uplink grant within the subframe 3 for the uplink-downlink configuration #2, when the uplink grant is transmitted within the subframe 3, K1 (or K2)=4, i.e., the transmission of the PUSCH may be started from the subframe 7, continued within four subframes each having the uplink resources, and ended within the subframe 6. At this time, a subframe offset value corresponding to the PHICH is 7, i.e., the PHICH may be received within the subframe 3.

As shown in FIG. 4C, which shows the transmission of the uplink grant within the subframe 3 for the uplink-downlink configuration #2, when the uplink grant is transmitted within the subframe 3, K1 (or K2)=4, i.e., the transmission of the PUSCH may be started from the subframe 7, continued within four subframes each having the uplink resources, and ended within the subframe 6. At this time, a subframe offset value corresponding to the PHICH is 4, i.e., the PHICH may be received within the subframe 0.

As shown in FIG. 4D, which shows the transmission of the uplink grant within the subframe 5 or 6 for the uplink-downlink configuration #2, when the uplink grant is transmitted within the subframe 5 or 6, K1=6 and K2=5, i.e., the transmission of the PUSCH may be started from the subframe 1, continued within four subframes each having the uplink resources, and ended within the subframe 7. At this time, a subframe offset value corresponding to the PHICH is 6, i.e., the PHICH may be received within the subframe 3.

As shown in FIG. 4E, which shows the transmission of the uplink grant within the subframe 8 for the uplink-downlink configuration #2, when the uplink grant is transmitted within the subframe 3, K1 (or K2)=4, i.e., the transmission of the PUSCH may be started from the subframe 2, continued within four subframes each having the uplink resources, and ended within the subframe 1. At this time, a subframe offset value corresponding to the PHICH is 7, i.e., the PHICH may be received within the subframe 8.

As shown in FIG. 4F, which shows the transmission of the uplink grant within the subframe 8 for the uplink-downlink configuration #2, when the uplink grant is transmitted within the subframe 8, K1 (or K2)=4, i.e., the transmission of the PUSCH may be started from the subframe 2, continued within four subframes each having the uplink resources, and ended within the subframe 1. At this time, a subframe offset value corresponding to the PHICH is 4, i.e., the PHICH may be received within the subframe 5.

Actually, the Ls in the above Tables are adopted to describe a subframe within which the retransmission is started after a retransmission instruction has been received, and K8, K9 and K10 are adopted to describe a subframe within which the retransmission instruction is to be received after the PUSCH has been transmitted, i.e., they refer to a same object from different perspectives.

The present disclosure further provides in some embodiments a transmission method which as shown in FIG. 5 includes a second reception step 501 of receiving, by a network side device, a PUSCH transmitted from a UE through uplink resources in bundled subframes which have been bundled from the first start subframe when a bundling transmission condition has been met. The bundled subframes at least include a special subframe having an UpPTS capable of being adopted for transmitting the PUSCH.

In a possible embodiment of the present disclosure, the quantity N' of physical blocks allocated for the UpPTS of the special subframe is calculated through [α*N], where [ ] represents a rounding operation, α represents a scaling coefficient, and N represents the quantity of physical blocks allocated for an uplink subframe.

In a possible embodiment of the present disclosure, α is a ratio of the quantity of symbols available for the transmission of the PUSCH within the uplink subframe to the quantity of symbols available for the transmission of the PUSCH within the UpPTS of the special subframe.

In a possible embodiment of the present disclosure, transmission power for the transmission of the PUSCH within the UpPTS of the special subframe is determined in accordance with N'.

In a possible embodiment of the present disclosure, at a frequency domain, a start position of the UpPTS of the special subframe for the transmission of the PUSCH is the same as a start position of the uplink subframe for the transmission of the PUSCH.

In a possible embodiment of the present disclosure, a position of the first start subframe is determined in accordance with a position of a reference subframe in a current frame structure and an uplink-downlink configuration of the current frame structure.

In a possible embodiment of the present disclosure, the reference subframe is a subframe within which an uplink grant has been transmitted or a subframe within which a PHICH was transmitted previously.

In a possible embodiment of the present disclosure, when the reference subframe is the subframe where the uplink grant is located, for an uplink-downlink configuration #2, the position of the reference subframe in the current frame structure is N1, and the position of the first start subframe is N1+K1. When N1 is 0 or 5, K1 is 6, and when N1 is 3 or 8, K1 is 4.

In a possible embodiment of the present disclosure, when the reference subframe is the subframe where the uplink grant is located, for the uplink-downlink configuration #2, the position of the reference subframe in the current frame structure is N2, and the position of the first start subframe is N2+K2. When N2 is 1 or 6, K2 is 5, and when N2 is 3 or 8, K2 is 4.

In a possible embodiment of the present disclosure, when the reference subframe is the subframe within which the PHICH was transmitted previously, for the uplink-downlink configuration #2, the position of the reference subframe in the current frame structure is N3−L1, and the position of the start subframe is N3+K3. When N3 is 0 or 5, L1 is 2 and K3 is 6, and when N3 is 3 or 8, L1 is 3 or 0 and K3 is 4.

In a possible embodiment of the present disclosure, when the reference subframe is the subframe within which the PHICH was transmitted previously, for the uplink-downlink configuration #2, the position of the reference subframe in the current frame structure is N4−L2, and the position of the first start subframe is N4+K4. When N4 is 1 or 6, L2 is 3 and K4 is 5, and when N4 is 3 or 8, L2 is 3 or 0 and K4 is 4.

In a possible embodiment of the present disclosure, when the reference subframe is the subframe where the uplink grant is located, for an uplink-downlink configuration #3, the position of the reference subframe in the current frame structure is N5, and the position of the first start subframe is N5+K5. When N5 is 0, 7, 8 or 9, K5 is 4.

In a possible embodiment of the present disclosure, when the reference subframe is the subframe within which the PHICH was transmitted previously, for the uplink-downlink configuration #3, the position of the reference subframe in the current frame structure is N6−L3, and the position of the first start subframe is N6+K6. When N6 is 0 or 9, L3 is 1 and K6 is 4, when N6 is 7, L3 is 7 and K6 is 4, and when N6 is 8, L3 is 0 and K6 is 4.

In a possible embodiment of the present disclosure, when the reference subframe is the subframe within which the PHICH was transmitted previously, for the uplink-downlink configuration #3, the position of the reference subframe in the current frame structure is N7−L4, and the position of the first start subframe is N7+K7. When N7 is 0 or 9, L4 is 1 and K7 is 4, when N7 is 7, L4 is 7 and K7 is 4, and when N7 is 8, L4 is 3 or 1 and K7 is 4.

As shown in FIG. 6, the transmission method further includes a second transmission step 402 of transmitting, within a second start subframe, the PHICH corresponding to the PUSCH received in the second reception step.

In a possible embodiment of the present disclosure, a position of the second start subframe is determined in accordance with a position of a last subframe of the bundled subframes in the current frame structure and the uplink-downlink configuration of the current frame structure.

In a possible embodiment of the present disclosure, for the uplink-downlink configuration #2, the position of the last subframe in the current frame structure is N8, and the position of the second start subframe is N8+K8. When N8 is 1 or 6, K8 is 4 or 7, and when N8 is 2 or 7, K8 is 6.

In a possible embodiment of the present disclosure, for the uplink-downlink configuration #3, the position of the last subframe in the current frame structure is N9, and the position of the second start subframe is N9+K9. When N9 is 1, K9 is 7, and when N9 is 2, 3 or 4, K9 is 6.

In a possible embodiment of the present disclosure, for the uplink-downlink configuration #3, the position of the last subframe in the current frame structure is N10, and the position of the second start subframe is N10+K10. When N10 is 1, K10 is 6 or 4, and when N10 is 2, 3 or 4, K10 is 6.

In a possible embodiment of the present disclosure, the quantity of HARQ processes is 2.

The present disclosure further provides in some embodiments a transmission device at a UE side which, as shown in FIG. 7, includes: a subframe determination module 71 configured to determine a first start subframe within which a PUSCH is to be transmitted currently; and a first transmission module 72 configured to, when a bundling transmission condition has been met, bind a plurality of subframes from the first start subframe, and transmit the PUSCH through uplink resources in the bundled subframes. The bundled subframes at least include a special subframe having an UpPTS capable of being adopted for transmitting the PUSCH.

In a possible embodiment of the present disclosure, the first transmission module is further configured to allocate physical blocks for the UpPTS of the special subframe. The quantity N' of the physical blocks is calculated through [α*N], where [ ] represents a rounding operation, α represents a scaling coefficient, and N represents the quantity of physical blocks allocated for an uplink subframe.

In a possible embodiment of the present disclosure, α is a ratio of the quantity of symbols available for the transmission of the PUSCH within the uplink subframe to the quantity of symbols available for the transmission of the PUSCH within the UpPTS of the special subframe.

In a possible embodiment of the present disclosure, transmission power for the transmission of the PUSCH within the UpPTS of the special subframe is determined in accordance with N'.

In a possible embodiment of the present disclosure, at a frequency domain, a start position of the UpPTS of the special subframe for the transmission of the PUSCH is the same as a start position of the uplink subframe for the transmission of the PUSCH.

In a possible embodiment of the present disclosure, a position of the first start subframe is determined in accordance with a position of a reference subframe in a current frame structure and an uplink-downlink configuration of the current frame structure.

In a possible embodiment of the present disclosure, the reference subframe is a subframe where an uplink grant is located or a subframe within which a PHICH has been received.

In a possible embodiment of the present disclosure, when the reference subframe is the subframe where the uplink grant is located, for an uplink-downlink configuration #2, the position of the reference subframe in the current frame structure is N1, and the position of the first start subframe is N1+K1. When N1 is 0 or 5, K1 is 6, and when N1 is 3 or 8, K1 is 4.

In a possible embodiment of the present disclosure, when the reference subframe is the subframe where the uplink grant is located, for the uplink-downlink configuration #2, the position of the reference subframe in the current frame structure is N2, and the position of the first start subframe is N2+K2. When N2 is 1 or 6, K2 is 5, and when N2 is 3 or 8, K2 is 4.

In a possible embodiment of the present disclosure, when the reference subframe is the subframe within which the PHICH has been received, for the uplink-downlink configuration #2, the position of the reference subframe in the current frame structure is N3−L1, and the position of the start subframe is N3+K3. When N3 is 0 or 5, L1 is 2 and K3 is 6, and when N3 is 3 or 8, L1 is 3 or 0 and K3 is 4.

In a possible embodiment of the present disclosure, when the reference subframe is the subframe within which the PHICH has been received, for the uplink-downlink configuration #2, the position of the reference subframe in the current frame structure is N4−L2, and the position of the first start subframe is N4+K4. When N4 is 1 or 6, L2 is 3 and K4 is 5, and when N4 is 3 or 8, L2 is 3 or 0 and K4 is 4.

In a possible embodiment of the present disclosure, when the reference subframe is the subframe where the uplink grant is located, for an uplink-downlink configuration #3, the position of the reference subframe in the current frame structure is N5, and the position of the first start subframe is N5+K5. When N5 is 0, 7, 8 or 9, K5 is 4.

In a possible embodiment of the present disclosure, when the reference subframe is the subframe within which the PHICH has been received, for the uplink-downlink configuration #3, the position of the reference subframe in the current frame structure is N6−L3, and the position of the first start subframe is N6+K6. When N6 is 0 or 9, L3 is 1 and K6 is 4, when N6 is 7, L3 is 7 and K6 is 4, and when N6 is 8, L3 is 0 and K6 is 4.

In a possible embodiment of the present disclosure, when the reference subframe is the subframe within which the PHICH has been received, for the uplink-downlink configuration #3, the position of the reference subframe in the current frame structure is N7−L4, and the position of the first start subframe is N7+K7. When N7 is 0 or 9, L4 is 1 and K7 is 4, when N7 is 7, L4 is 7 and K7 is 4, and when N7 is 8, L4 is 3 or 1 and K7 is 4.

Figure 8:
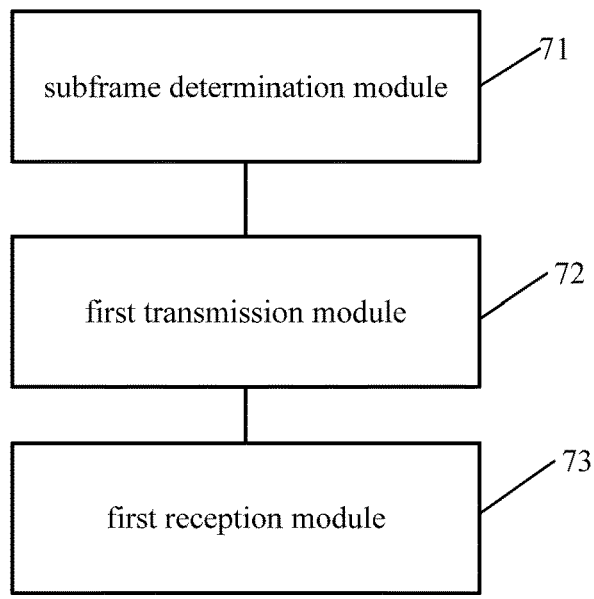
FIG. 8 is another schematic view showing the transmission device at a UE side according to some embodiments of the present disclosure.

In a possible embodiment of the present disclosure, as shown in FIG. 8, the transmission device further includes a first reception module 73 configured to receive, within a second start subframe, the PHICH corresponding to the PUSCH transmitted by the first transmission module.

In a possible embodiment of the present disclosure, a position of the second start subframe is determined in accordance with a position of a last subframe of the bundled subframes in the current frame structure and the uplink-downlink configuration of the current frame structure.

In a possible embodiment of the present disclosure, for the uplink-downlink configuration #2, the position of the last subframe in the current frame structure is N8, and the position of the second start subframe is N8+K8. When N8 is 1 or 6, K8 is 4 or 7, and when N8 is 2 or 7, K8 is 6.

In a possible embodiment of the present disclosure, for the uplink-downlink configuration #3, the position of the last subframe in the current frame structure is N9, and the position of the second start subframe is N9+K9. When N9 is 1, K9 is 7, and when N9 is 2, 3 or 4, K9 is 6.

In a possible embodiment of the present disclosure, for the uplink-downlink configuration #3, the position of the last subframe in the current frame structure is N10, and the position of the second start subframe is N10+K10. When N10 is 1, K10 is 6 or 4, and when N10 is 2, 3 or 4, K10 is 6.

In a possible embodiment of the present disclosure, the quantity of HARQ processes is 2.

Figure 9:
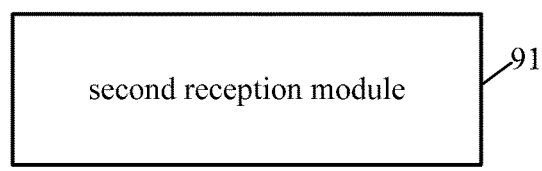
FIG. 9 is a schematic view showing a transmission device at a network side according to some embodiments of the present disclosure.

The present disclosure further provides in some embodiments a transmission device at a network side which, as shown in FIG. 9, includes a second reception module 91 configured to receive a PUSCH transmitted from a UE through uplink resources in bundled subframes which have been bundled from the first start subframe when a bundling transmission condition has been met, the bundled subframes at least comprising a special subframe having an UpPTS capable of being adopted for transmitting the PUSCH.

In a possible embodiment of the present disclosure, the quantity N' of physical blocks allocated for the UpPTS of the special subframe is calculated through [α*N], where [ ] represents a rounding operation, α represents a scaling coefficient, and N represents the quantity of physical blocks allocated for an uplink subframe.

In a possible embodiment of the present disclosure, a is a ratio of the quantity of symbols available for the transmission of the PUSCH within the uplink subframe to the quantity of symbols available for the transmission of the PUSCH within the UpPTS of the special subframe.

In a possible embodiment of the present disclosure, transmission power for the transmission of the PUSCH within the UpPTS of the special subframe is determined in accordance with N'.

In a possible embodiment of the present disclosure, at a frequency domain, a start position of the UpPTS of the special subframe for the transmission of the PUSCH is the same as a start position of the uplink subframe for the transmission of the PUSCH.

In a possible embodiment of the present disclosure, a position of the first start subframe is determined in accordance with a position of a reference subframe in a current frame structure and an uplink-downlink configuration of the current frame structure.

In a possible embodiment of the present disclosure, the reference subframe is a subframe within which an uplink grant has been transmitted or a subframe within which a PHICH was transmitted previously.

In a possible embodiment of the present disclosure, when the reference subframe is the subframe where the uplink grant is located, for an uplink-downlink configuration #2, the position of the reference subframe in the current frame structure is N1, and the position of the first start subframe is N1+K1. When N1 is 0 or 5, K1 is 6, and when N1 is 3 or 8, K1 is 4.

In a possible embodiment of the present disclosure, when the reference subframe is the subframe where the uplink grant is located, for the uplink-downlink configuration #2, the position of the reference subframe in the current frame structure is N2, and the position of the first start subframe is N2+K2. When N2 is 1 or 6, K2 is 5, and when N2 is 3 or 8, K2 is 4.

In a possible embodiment of the present disclosure, when the reference subframe is the subframe within which the PHICH was transmitted previously, for the uplink-downlink configuration #2, the position of the reference subframe in the current frame structure is N3−L1, and the position of the start subframe is N3+K3. When N3 is 0 or 5, L1 is 2 and K3 is 6, and when N3 is 3 or 8, L1 is 3 or 0 and K3 is 4.

In a possible embodiment of the present disclosure, when the reference subframe is the subframe within which the PHICH was transmitted previously, for the uplink-downlink configuration #2, the position of the reference subframe in the current frame structure is N4−L2, and the position of the first start subframe is N4+K4. When N4 is 1 or 6, L2 is 3 and K4 is 5, and when N4 is 3 or 8, L2 is 3 or 0 and K4 is 4.

In a possible embodiment of the present disclosure, when the reference subframe is the subframe where the uplink grant is located, for an uplink-downlink configuration #3, the position of the reference subframe in the current frame structure is N5, and the position of the first start subframe is N5+K5. When N5 is 0, 7, 8 or 9, K5 is 4.

In a possible embodiment of the present disclosure, when the reference subframe is the subframe within which the PHICH was transmitted previously, for an uplink-downlink configuration #3, the position of the reference subframe in the current frame structure is N6−L3, and the position of the first start subframe is N6+K6. When N6 is 0 or 9, L3 is 1 and K6 is 4, when N6 is 7, L3 is 7 and K6 is 4, and when N6 is 8, L3 is 0 and K6 is 4.

In a possible embodiment of the present disclosure, when the reference subframe is the subframe within which the PHICH was transmitted previously, for the uplink-downlink configuration #3, the position of the reference subframe in the current frame structure is N7−L4, and the position of the first start subframe is N7+K7. When N7 is 0 or 9, L4 is 1 and K7 is 4, when N7 is 7, L4 is 7 and K7 is 4, and when N7 is 8, L4 is 1 or 3 and K7 is 4.

Figure 10:
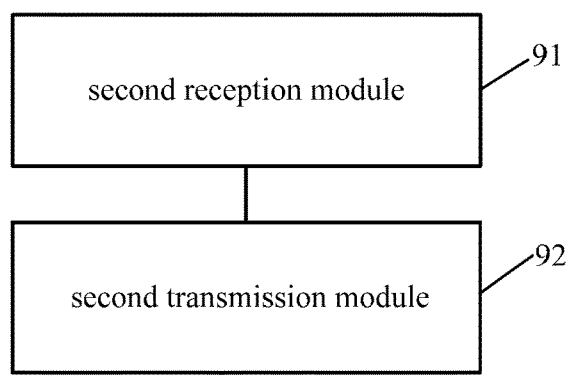
FIG. 10 is another schematic view showing the transmission device at a network side according to some embodiments of the present disclosure.

In a possible embodiment of the present disclosure, as shown in FIG. 10, the transmission device further includes a second transmission module 92 configured to transmit, within a second start subframe, the PHICH corresponding to the PUSCH received by the second reception module.

In a possible embodiment of the present disclosure, a position of the second start subframe is determined in accordance with a position of a last subframe of the bundled subframes in the current frame structure and the uplink-downlink configuration of the current frame structure.

In a possible embodiment of the present disclosure, for the uplink-downlink configuration #2, the position of the last subframe in the current frame structure is N8, and the position of the second start subframe is N8+K8. When N8 is 1 or 6, K8 is 4 or 7, and when N8 is 2 or 7, K8 is 6.

In a possible embodiment of the present disclosure, for the uplink-downlink configuration #3, the position of the last subframe in the current frame structure is N9, and the position of the second start subframe is N9+K9. When N9 is 1, K9 is 7, and when N9 is 2, 3 or 4, K9 is 6.

In a possible embodiment of the present disclosure, for the uplink-downlink configuration #3, the position of the last subframe in the current frame structure is N10, and the position of the second start subframe is N10+K10. When N10 is 1, K10 is 6 or 4, and when N10 is 2, 3 or 4, K10 is 6.

In a possible embodiment of the present disclosure, the quantity of HARQ processes is 2.

The present disclosure further provides in some embodiments a mobile communication terminal including the above-mentioned transmission device at the UE side.

The present disclosure further provides in some embodiments a mobile communication terminal including the above-mentioned transmission device at the network side.

It should be appreciated that, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The serial numbers of the embodiments are for illustrative purposes only, but shall not be used to define that one embodiment is superior to the other.

Through the above-mentioned description, it may be apparent for a person skilled in the art that the present disclosure may be implemented by software as well as a necessary common hardware platform, or by hardware, and the former may be better in most cases. Based on this, the technical solutions of the present disclosure, partial or full, or parts of the technical solutions of the present disclosure contributing to the related art, may appear in the form of software products, which may be stored in a storage medium (e.g., Read-Only Memory (ROM)/Random Access Memory (RAM), magnetic disk or optical disk) and include several instructions so as to enable a terminal device (mobile phone, computer, server, air conditioner or network device) to execute the method in the embodiments of the present disclosure.

Figure 11:
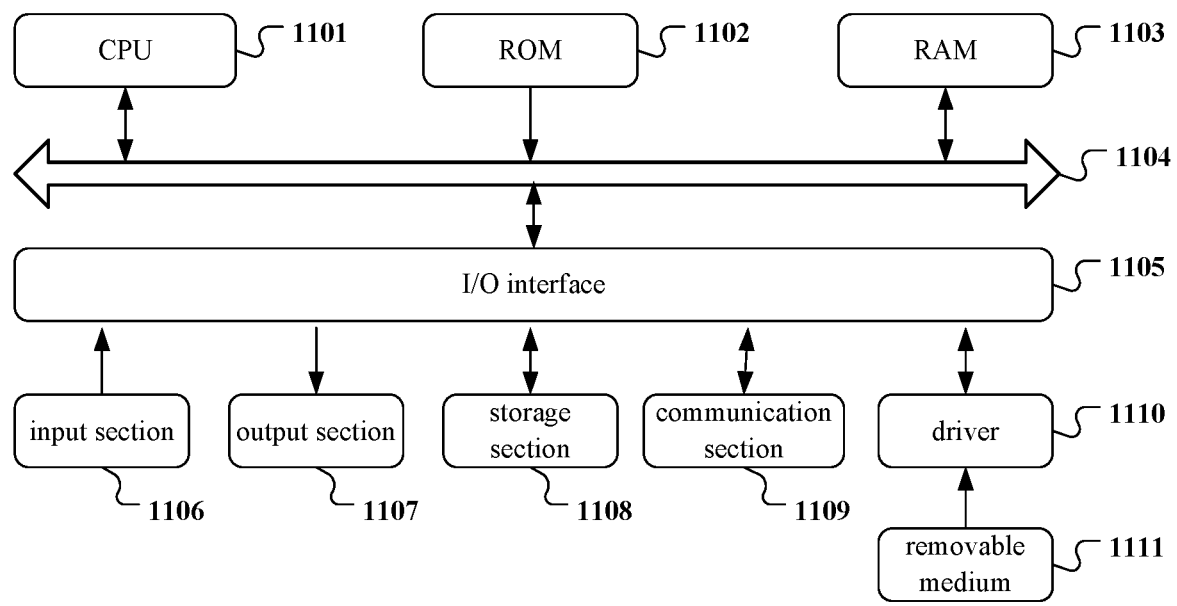
FIG. 11 is a schematic view showing a computer system adapted to implement the transmission method or transmission device according to some embodiments of the present disclosure.

FIG. 11 shows a structure of a computer system 1100 adapted to implement the transmission method and the transmission device.

As shown in FIG. 11, the computer system 1100 includes a Central Processing Unit (CPU) 1101 configured to execute various processings in accordance with programs stored in a ROM 1102 or programs loaded into a RAM 1103 via a storage section 1108. Various programs and data desired for the operation of the computer system 1100 may also be stored in the RAM 1103. The CPU 1101, the ROM 1102 and the RAM 1103 may be connected to each other via a bus 1104. In addition, an input/output (I/O) interface 1105 may also be connected to the bus 1104.

An input section 1106 (including a keyboard and a mouse), an output section 1107 (including a Cathode Ray Tube (CRT) or a Liquid Crystal Display (LCD), and a speaker), a storage section 1108 (including a hard disk) and a communication section 1109 (including a network interface card such as a Local Area Network (LAN) card or a Modem) may also be connected to the input/output interface 1105. The communication section 1109 is configured to perform the communication processing over a network, e.g., Internet. If desired, a driver 1110 may also be connected to the input/output interface 1105, and a removable storage medium 1111 such as a magnetic disk, an optical disk, a magneto-optical disk or a semiconductor memory may be installed on the driver 1110, so as to read the computer programs therefrom and install them into the storage section 1108.

Especially, the procedures described with reference to the flow charts may be implemented as a computer software program. For example, the computer software product may include a computer program physically stored in computer-readable medium, and the computer program may include program codes capable of being used to execute the methods in the flow charts. Hence, the computer program may be loaded and installed from the network via the communication section 1109, and/or installed from the removable storage medium 1111.

Possible architecture, functions and operations of the system, method and computer program product in the embodiments of the present disclosure are shown in the flow charts and block diagrams. Each block in the flow charts or block diagrams may represent a part of a module, a program segment or a code. The part of the module, program segment or code may include one or more executable instructions for achieving a prescribed logical function. It should be appreciated that, in some substitutions, the steps represented by the blocks may be performed in an order different from that shown in the drawings. For example, the steps represented by two blocks connected to each other may actually be performed substantially simultaneously, or in an opposite order, depending on the functions involved therein. It should be also appreciated that, each block in the block diagrams and/or the flow charts, and a combination of the blocks may be implemented through a dedicated hardware-based system capable of achieving a prescribed function or operation, or through dedicated hardware in conjunction with a computer instruction.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A transmission method, comprising:
   determining, by a User Equipment (UE), a first start subframe within which a Physical Uplink Shared Channel (PUSCH) is to be transmitted currently; and
   bundling a plurality of subframes from the first start subframe, when a bundling transmission condition has been met, and transmitting the PUSCH through uplink resources in the bundled plurality of subframes, the bundled plurality of subframes at least comprising a special subframe having an Uplink Pilot Time Slot (UpPTS) capable of being adopted for transmitting the PUSCH,
   wherein a position of the first start subframe is determined in accordance with a position of a reference subframe in a current frame structure and an uplink-downlink configuration of the current frame structure; the reference subframe is a subframe where an uplink grant is located or a subframe within which a Physical Hybrid Automatic Repeat Request Indication Channel (PHICH) has been received;
   wherein,
   when the reference subframe is the subframe where the uplink grant is located, for an uplink-downlink configuration #2, the position of the reference subframe in the current frame structure is N1, and the position of the first start subframe is N1+K1, wherein when N1 is 0 or 5, K1 is 6, and when N1 is 3 or 8, K1 is 4; or
   when the reference subframe is the subframe where the uplink grant is located, for an uplink-downlink configuration #2, the position of the reference subframe in the current frame structure is N2, and the position of the first start subframe is N2+K2, wherein when N2 is 1 or 6, K2 is 5, and when N2 is 3 or 8, K2 is 4; or
   when the reference subframe is the subframe within which the PHICH has been received, for an uplink-downlink configuration #2, the position of the reference subframe in the current frame structure is N3−L1, and the position of the start subframe is N3+K3, wherein when N3 is 0 or 5, L1 is 2 and K3 is 6, and when N3 is 3 or 8, L1 is 3 or 0 and K3 is 4; or
   when the reference subframe is the subframe within which the PHICH has been received, for an uplink-downlink configuration #2, the position of the reference subframe in the current frame structure is N4−L2, and the position of the first start subframe is N4+K4, wherein when N4 is 1 or 6, L2 is 3 and K4 is 5, and when N4 is 3 or 8, L2 is 3 or 0 and K4 is 4; or
   when the reference subframe is the subframe where the uplink grant is located, for an uplink-downlink configuration #3, the position of the reference subframe in the current frame structure is N5, and the position of the first start subframe is N5+K5, wherein when N5 is 0, 7, 8 or 9, K5 is 4; or
   when the reference subframe is the subframe within which the PHICH has been received, for an uplink-downlink configuration #3, the position of the reference subframe in the current frame structure is N6−L3, and the position of the first start subframe is N6+K6, wherein when N6 is 0 or 9, L3 is 1 and K6 is 4, when N6 is 7, L3 is 7 and K6 is 4, and when N6 is 8, L3 is 0 and K6 is 4; or
   when the reference subframe is the subframe within which the PHICH has been received, for an uplink-downlink configuration #3, the position of the reference subframe in the current frame structure is N7−L4, and the position of the first start subframe is N7+K7, wherein when N7 is 0 or 9, L4 is 1 and K7 is 4, when N7 is 7, L4 is 7 and K7 is 4, and when N7 is 8, L4 is 3 or 1 and K7 is 4.

2. The transmission method according to claim 1, wherein a quantity N' of physical blocks allocated for the UpPTS of the special subframe is calculated through [α*N], where [ ] represents a rounding operation, α represents a scaling coefficient, and N represents a quantity of physical blocks allocated for an uplink subframe.

3. The transmission method according to claim 2, wherein α is a ratio of the quantity of symbols available for the transmission of the PUSCH within the uplink subframe to the quantity of symbols available for the transmission of the PUSCH within the UpPTS of the special subframe.

4. The transmission method according to claim 2, wherein transmission power for the transmission of the PUSCH within the UpPTS of the special subframe is determined in accordance with the N'.

5. The transmission method according to claim 1, wherein in a frequency domain, a start position of the UpPTS of the special subframe for the transmission of the PUSCH is the same as a start position of the uplink subframe for the transmission of the PUSCH.

6. The transmission method according to claim 1, further comprising:
   receiving, within a second start subframe, the PHICH corresponding to the transmitted PUSCH;
   wherein a position of the second start subframe is determined in accordance with a position of a last subframe of the bundled plurality of subframes in the current frame structure and the uplink-downlink configuration of the current frame structure;

wherein for the uplink-downlink configuration #2, the position of the last subframe in the current frame structure is N8, and the position of the second start subframe is N8+K8, wherein when N8 is 1 or 6, K8 is 4 or 7, and when N8 is 2 or 7, K8 is 6; or wherein for the uplink-downlink configuration #3, the position of the last subframe in the current frame structure is N9, and the position of the second start subframe is N9+K9, wherein when N9 is 1, K9 is 7, and when N9 is 2, 3 or 4, K9 is 6; or wherein for the uplink-downlink configuration #3, the position of the last subframe in the current frame structure is N10, and the position of the second start subframe is N10+K10, wherein when N10 is 1, K10 is 6 or 4, and when N10 is 2, 3 or 4, K10 is 6.

7. The transmission method according to claim 1, wherein a quantity of Hybrid Automatic Repeat reQuest (HARQ) processes is 2.

8. A reception method, comprising:

receiving, by a network side device, a PUSCH transmitted from a UE through uplink resources in a bundled plurality of subframes which have been bundled from the first start subframe when a bundling transmission condition has been met, the bundled plurality of subframes at least comprising a special subframe having an UpPTS capable of being adopted for transmitting the PUSCH, wherein a position of the first start subframe is determined in accordance with a position of a reference subframe in a current frame structure and an uplink-downlink configuration of the current frame structure; wherein the reference subframe is a subframe within which an uplink grant has been transmitted or a subframe within which a Physical Hybrid Automatic Repeat Request Indication Channel (PHICH) was transmitted previously;

wherein, when the reference subframe is the subframe where the uplink grant is located, for an uplink-downlink configuration #2, the position of the reference subframe in the current frame structure is N1, and the position of the first start subframe is N1+K1, wherein when N1 is 0 or 5, K1 is 6, and when N1 is 3 or 8, K1 is 4; or when the reference subframe is the subframe where the uplink grant is located, for an uplink-downlink configuration #2, the position of the reference subframe in the current frame structure is N2, and the position of the first start subframe is N2+K2, wherein when N2 is 1 or 6, K2 is 5, and when N2 is 3 or 8, K2 is 4; or when the reference subframe is the subframe within which the PHICH was transmitted previously, for an uplink-downlink configuration #2, the position of the reference subframe in the current frame structure is N3−L1, and the position of the start subframe is N3+K3, wherein when N3 is 0 or 5, L1 is 2 and K3 is 6, and when N3 is 3 or 8, L1 is 3 or 0 and K3 is 4; or when the reference subframe is the subframe within which the PHICH was transmitted previously, for an uplink-downlink configuration #2, the position of the reference subframe in the current frame structure is N4−L2, and the position of the first start subframe is N4+K4, wherein when N4 is 1 or 6, L2 is 3 and K4 is 5, and when N4 is 3 or 8, L2 is 3 or 0 and K4 is 4; or when the reference subframe is the subframe where the uplink grant is located, for an uplink-downlink configuration #3, the position of the reference subframe in the current frame structure is N5, and the position of the first start subframe is N5+K5, wherein when N5 is 0, 7, 8 or 9, K5 is 4; or when the reference subframe is the subframe within which the PHICH was transmitted previously, for an uplink-downlink configuration #3, the position of the reference subframe in the current frame structure is N6−L3, and the position of the first start subframe is N6+K6, wherein when N6 is 0 or 9, L3 is 1 and K6 is 4, when N6 is 7, L3 is 7 and K6 is 4, and when N6 is 8, L3 is 0 and K6 is 4; or when the reference subframe is the subframe within which the PHICH was transmitted previously, for an uplink-downlink configuration #3, the position of the reference subframe in the current frame structure is N7−L4, and the position of the first start subframe is N7+K7, wherein when N7 is 0 or 9, L4 is 1 and K7 is 4, when N7 is 7, L4 is 7 and K7 is 4, and when N7 is 8, L4 is 3 or 1 and K7 is 4.

9. The reception method according to claim 8, wherein a quantity N' of physical blocks allocated for the UpPTS of the special subframe is calculated through [α*N], where [ ] represents a rounding operation, α represents a scaling coefficient, and N represents a quantity of physical blocks allocated for an uplink subframe.

10. The reception method according to claim 9, wherein α is α ratio of the quantity of symbols available for the transmission of the PUSCH within the uplink subframe to the quantity of symbols available for the transmission of the PUSCH within the UpPTS of the special subframe.

11. The reception method according to claim 9, wherein transmission power for the transmission of the PUSCH within the UpPTS of the special subframe is determined in accordance with the N'.

12. The reception method according to claim 8, wherein in a frequency domain, a start position of the UpPTS of the special subframe for the transmission of the PUSCH is the same as a start position of the uplink subframe for the transmission of the PUSCH.

13. The reception method according to claim 8, further comprising:

transmitting, within a second start subframe, the PHICH corresponding to the received PUSCH;

wherein a position of the second start subframe is determined in accordance with a position of a last subframe of the bundled plurality of subframes in the current frame structure and the uplink-downlink configuration of the current frame structure;

wherein for the uplink-downlink configuration #2, the position of the last subframe in the current frame structure is N8, and the position of the second start subframe is N8+K8, wherein when N8 is 1 or 6, K8 is 4 or 7, and when N8 is 2 or 7, K8 is 6; or wherein for the uplink-downlink configuration #3, the position of the last subframe in the current frame structure is N9, and the position of the second start subframe is N9+K9, wherein when N9 is 1, K9 is 7, and when N9 is 2, 3 or 4, K9 is 6; or wherein for the uplink-downlink configuration #3, the position of the last subframe in the current frame structure is N10, and the position of the second start subframe is N10+K10, wherein when N10 is 1, K10 is 6 or 4, and when N10 is 2, 3 or 4, K10 is 6.

14. The reception method according to claim 8, wherein a quantity of HARQ processes is 2.

15. A transmission device at a UE side, comprising a processor, and a memory configured to store therein a computer-readable instruction capable of being executed by the processor, wherein the processor is configured to execute the computer-readable instruction, so as to: determine a first start subframe within which a PUSCH is to be transmitted currently; and when a bundling transmission condition has been met, bind a plurality of subframes from the first start subframe, and transmit the PUSCH through uplink resources in the bundled plurality of subframes, wherein the bundled plurality of subframes at least comprise a special subframe having an UpPTS capable of being adopted for transmitting the PUSCH, wherein a position of the first start subframe is determined in accordance with a position of a reference subframe in a current frame structure and an uplink-downlink configuration of the current frame structure; the reference subframe is a subframe where an uplink grant is located or a subframe within which a Physical Hybrid Automatic Repeat Request Indication Channel (PHICH) has been received;

wherein, when the reference subframe is the subframe where the uplink grant is located, for an uplink-downlink configuration #2, the position of the reference subframe in the current frame structure is N1, and the position of the first start subframe is N1+K1, wherein when N1 is 0 or 5, K1 is 6, and when N1 is 3 or 8, K1 is 4; or when the reference subframe is the subframe where the uplink grant is located, for an uplink-downlink configuration #2, the position of the reference subframe in the current frame structure is N2, and the position of the first start subframe is N2+K2, wherein when N2 is 1 or 6, K2 is 5, and when N2 is 3 or 8, K2 is 4; or when the reference subframe is the subframe within which the PHICH has been received, for an uplink-downlink configuration #2, the position of the reference subframe in the current frame structure is N3−L1, and the position of the start subframe is N3+K3, wherein when N3 is 0 or 5, L1 is 2 and K3 is 6, and when N3 is 3 or 8, L1 is 3 or 0 and K3 is 4; or when the reference subframe is the subframe within which the PHICH has been received, for an uplink-downlink configuration #2, the position of the reference subframe in the current frame structure is N4−L2, and the position of the first start subframe is N4+K4, wherein when N4 is 1 or 6, L2 is 3 and K4 is 5, and when N4 is 3 or 8, L2 is 3 or 0 and K4 is 4; or when the reference subframe is the subframe where the uplink grant is located, for an uplink-downlink configuration #3, the position of the reference subframe in the current frame structure is N5, and the position of the first start subframe is N5+K5, wherein when N5 is 0, 7, 8 or 9, K5 is 4; or when the reference subframe is the subframe within which the PHICH has been received, for an uplink-downlink configuration #3, the position of the reference subframe in the current frame structure is N6−L3, and the position of the first start subframe is N6+K6, wherein when N6 is 0 or 9, L3 is 1 and K6 is 4, when N6 is 7, L3 is 7 and K6 is 4, and when N6 is 8, L3 is 0 and K6 is 4; or when the reference subframe is the subframe within which the PHICH has been received, for an uplink-downlink configuration #3, the position of the reference subframe in the current frame structure is N7−L4, and the position of the first start subframe is N7+K7, wherein when N7 is 0 or 9, L4 is 1 and K7 is 4, when N7 is 7, L4 is 7 and K7 is 4, and when N7 is 8, L4 is 3 or 1 and K7 is 4.

16. The transmission device according to claim 15, wherein a quantity N' of physical blocks allocated for the UpPTS of the special subframe is calculated through [α*N], where [ ] represents a rounding operation, α represents a scaling coefficient, and N represents a quantity of physical blocks allocated for an uplink subframe.

17. The transmission device according to claim 15, wherein in a frequency domain, a start position of the UpPTS of the special subframe for the transmission of the PUSCH is the same as a start position of the uplink subframe for the transmission of the PUSCH.

* * * * *